(12) United States Patent
Pilcher et al.

(10) Patent No.: US 11,032,974 B2
(45) Date of Patent: *Jun. 15, 2021

(54) EXTERNAL BELT GUIDE FOR ROUND BALER

(71) Applicant: Deere & Company, Moline, IL (US)

(72) Inventors: Steven R. Pilcher, Bloomfield, IA (US); Henry D. Anstey, Ottumwa, IA (US)

(73) Assignee: DEERE & COMPANY, Moline, IL (US)

(*) Notice: Subject to any disclaimer, the term of this patent is extended or adjusted under 35 U.S.C. 154(b) by 534 days.

This patent is subject to a terminal disclaimer.

(21) Appl. No.: 15/883,735

(22) Filed: Jan. 30, 2018

(65) Prior Publication Data
US 2018/0242527 A1 Aug. 30, 2018

Related U.S. Application Data

(60) Provisional application No. 62/462,997, filed on Feb. 24, 2017.

(51) Int. Cl.
*A01F 15/08* (2006.01)
*A01F 15/07* (2006.01)
(Continued)

(52) U.S. Cl.
CPC .......... *A01F 15/08* (2013.01); *A01F 15/0715* (2013.01); *A01F 15/18* (2013.01);
(Continued)

(58) Field of Classification Search
CPC ...... A01F 15/08; A01F 15/0715; A01F 15/18; A01F 15/106; A01F 2015/0795;
(Continued)

(56) References Cited

U.S. PATENT DOCUMENTS

| 2,797,794 | A | * | 7/1957 | Bradley | ................. B65G 39/16 |
| | | | | | 198/806 |
| 4,205,513 | A | * | 6/1980 | Shokoples | .......... A01F 15/0765 |
| | | | | | 100/5 |

(Continued)

FOREIGN PATENT DOCUMENTS

| EP | 2266386 B2 * | 9/2017 | ......... A01F 15/0715 |
| WO | WO-2013124836 A1 * | 8/2013 | ......... A01F 15/0715 |

OTHER PUBLICATIONS

Extended European Search Report for European Patent Application No. EP 18 15 8031 dated Jul. 12, 2018, 8 pages.

*Primary Examiner* — Adam J Eiseman
*Assistant Examiner* — Mohammed S. Alawadi
(74) *Attorney, Agent, or Firm* — Klintworth & Rozenblat IP LLP (57) ABSTRACT

A round baler is provided. The baler includes a bale forming chamber having a belt to form a bale of crop material. The baler also includes a wrap feed system. The baler includes a belt guide coupled to the baler so as to be external to the bale forming chamber. The belt guide includes an inwardly facing surface substantially parallel to the belt. The belt guide includes a protrusion extending inwardly towards the bale forming chamber. The protrusion is positioned adjacent a side of the belt. The belt guide is configured to sandwich wrap material between the belt and the belt guide.

17 Claims, 6 Drawing Sheets

(51) Int. Cl.
*A01F 15/18* (2006.01)
*A01F 15/10* (2006.01)

(52) U.S. Cl.
CPC ... *A01F 2015/077* (2013.01); *A01F 2015/078* (2013.01); *A01F 2015/0735* (2013.01); *A01F 2015/0795* (2013.01)

(58) Field of Classification Search
CPC ........ A01F 2015/078; A01F 2015/0735; A01F 2015/077; A01F 15/071; B65G 15/64; B65G 15/62; B65G 39/16
USPC .......................................................... 100/88
See application file for complete search history.

(56) References Cited

U.S. PATENT DOCUMENTS

| | | | | |
|---|---|---|---|---|
| 4,428,282 A * | 1/1984 | Anstey | ................... | A01F 15/07 100/88 |
| 4,444,098 A * | 4/1984 | Soteropulos | ............ | A01F 15/07 100/88 |
| 4,697,402 A * | 10/1987 | Anstey | ................ | A01F 15/0715 53/506 |
| 4,707,974 A * | 11/1987 | Harthoorn | ............... | A01F 15/07 100/88 |
| 4,890,449 A * | 1/1990 | Hering | ................... | A01F 15/07 56/341 |
| 4,969,315 A * | 11/1990 | Ardueser | ............ | A01F 15/0715 53/389.2 |
| 5,129,207 A * | 7/1992 | Butler | ................. | A01F 15/0715 53/118 |
| 5,129,208 A * | 7/1992 | Van Zee | ............. | A01F 15/0715 53/118 |
| 5,152,123 A * | 10/1992 | Viaud | ................. | A01F 15/0715 100/4 |
| 5,483,785 A * | 1/1996 | DiCarlo | ................ | A01F 15/071 53/211 |
| 6,006,504 A * | 12/1999 | Myers | ................ | A01F 15/0715 53/556 |
| 6,272,816 B1 * | 8/2001 | Viaud | ................ | A01F 15/0715 242/441.4 |
| 6,594,975 B2 * | 7/2003 | Anstey | ................ | A01F 15/0715 53/118 |
| 6,606,843 B1 * | 8/2003 | Anstey | ................ | A01F 15/0715 53/556 |
| 6,622,463 B1 * | 9/2003 | Anstey | .................... | A01F 15/12 53/118 |
| 7,181,900 B2 * | 2/2007 | Hood | ................. | A01F 15/0715 100/88 |
| 7,311,040 B2 * | 12/2007 | Viaud | .................... | A01F 15/07 100/87 |
| 8,037,814 B1 * | 10/2011 | Smith | .................. | B30B 9/3082 100/88 |
| 9,078,399 B2 * | 7/2015 | Hubach | .................. | A01F 15/18 |
| 9,415,888 B2 * | 8/2016 | Smith | ................ | A01F 15/0715 |
| 2002/0189197 A1 * | 12/2002 | Anstey | ................ | A01F 15/0715 53/118 |
| 2005/0109007 A1 * | 5/2005 | Hood | ................. | A01F 15/0715 56/341 |
| 2012/0132090 A1 * | 5/2012 | Pourchet | ............ | A01F 15/0883 100/88 |
| 2012/0240527 A1 * | 9/2012 | Herron | ................ | A01F 15/0715 53/461 |
| 2013/0032047 A1 * | 2/2013 | Marques | ................. | A01F 15/18 100/88 |
| 2013/0192959 A1 * | 8/2013 | Kitamura | ............... | B65H 5/025 198/806 |
| 2013/0233680 A1 * | 9/2013 | Sharp | .................... | B65G 15/60 198/806 |
| 2014/0346015 A1 * | 11/2014 | Moon | .................... | B65G 15/60 198/835 |
| 2015/0210475 A1 * | 7/2015 | Batchelder | ............ | B65G 45/12 198/497 |
| 2016/0137372 A1 * | 5/2016 | Anstey | ................ | A01F 15/0715 428/190 |
| 2018/0310482 A1 * | 11/2018 | Reijersen Van Buuren | ................ | A01F 15/0715 |

* cited by examiner

EXTERNAL BELT GUIDE FOR ROUND BALER

CROSS-REFERENCE TO RELATED APPLICATION(S)

This application claims the benefit of U.S. Provisional Application No. 62/462,997, filed on Feb. 24, 2017, which is incorporated herein by reference.

STATEMENT OF FEDERALLY SPONSORED RESEARCH OR DEVELOPMENT

Not applicable.

FIELD OF THE DISCLOSURE

This disclosure relates to crop-packing devices, such as round balers, and to an external belt guide for a round baler.

BACKGROUND OF THE DISCLOSURE

In various settings, crops or other material may be arranged for pick-up by mechanized equipment. For example, cut material (e.g., hay) in a field may be raked or otherwise arranged into windrows in the field for further processing. Various mechanisms may then be utilized to gather such material. For example, a crop-packaging device such as a baler may be pulled by a tractor along a windrow of cut material and may gather the material from the windrow. The material may then be passed into a packaging (e.g., baling) chamber for formation into a crop package (e.g., a bale). In various configurations, such a crop package may be generally cylindrical in shape and may be typically referred to as a "round" bale. Similarly, a baler that forms a round bale may be referred to as a "round" baler.

Once formed, a bale (or other crop package) may be ejected from the bale forming chamber of the baler (or other crop-packaging device). In known round balers, for example, a rear gate to the bale forming chamber may open (e.g., by pivoting backward and vertically upward), such that a formed bale may move backward (and typically fall downward) out of the bale forming chamber. In certain operations, bales (or other crop packages) may be wrapped with wrap material before (or after) being ejected from the bale forming (or other packaging) chamber. Such wrapping may be useful, for example, to provide a degree of surface protection and for structural integrity.

Generally, the packaging chamber includes one or more belts, which are movable to manipulate the cut material into the bale. When crop material is acting on the belts, the crop material provides tension, which maintains the position of the belts within the bale forming chamber. When crop material is no longer acting on the belts, however, the belts may have slack, which can lead to the belts becoming misaligned within the bale forming chamber. In these instances, a belt guide may be used to guide the position of the belt to maintain the proper alignment of the belt. Depending upon the placement of the belt guide, however, crop material may accumulate about the belt guide, which may cause friction between the belt and the belt guide. Moreover, in instances where the bale is wrapped with the wrap material before being ejected from the bale forming chamber, the friction may generate heat on the belt and/or belt guide, which may undesirably impact the wrap material.

SUMMARY OF THE DISCLOSURE

The disclosure provides an external belt guide for a baler that is coupled to the baler external to the baling chamber, which reduces an accumulation of crop material while enabling the guiding of a belt and wrap material into the baling chamber.

In one aspect, the disclosure provides a round baler. The baler includes a bale forming chamber having a belt to form a bale of crop material. The baler also includes a wrap feed system. The baler includes a belt guide coupled to the baler so as to be external to the bale forming chamber. The belt guide includes an inwardly facing surface substantially parallel to the belt. The belt guide includes a protrusion extending inwardly towards the bale forming chamber. The protrusion is positioned adjacent a side of the belt. The belt guide is configured to sandwich wrap material between the belt and the belt guide.

In another aspect, the disclosure provides a round baler. The baler includes a bale forming chamber having a belt to form a bale of crop material and the belt is supported on a roller. The baler includes a wrap feed system and a belt guide coupled to the baler so as to be external to the bale forming chamber and proximate the roller. The belt guide includes an inwardly facing surface substantially parallel to the belt and a protrusion extending inwardly towards the bale forming chamber. The protrusion is positioned adjacent a side of the belt. The belt guide is configured to sandwich wrap material between the belt and the belt guide, and the wrap material flows over the protrusion of the belt guide along the edge the belt.

In yet another aspect, the disclosure provides a round baler. The baler includes a bale forming chamber having a belt to form a bale of crop material, and the belt is supported on a roller. The baler includes a wrap feed system, and a belt guide coupled to the baler so as to be external to the bale forming chamber and proximate the roller. The belt guide includes an inwardly facing surface substantially parallel to the belt. The belt guide includes a protrusion extending inwardly towards the bale forming chamber. The protrusion is positioned adjacent a side of the belt. The belt guide is configured to sandwich wrap material between the inwardly facing surface and an external surface of the belt.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As noted above, in various situations it may be useful to gather material (e.g., cut plant material) for further processing. For example, a cutting or raking operation may leave cut material (e.g., hay) arranged in windrows in a field. Balers and other equipment may then be used to gather the material from the windrows for formation into bales.

The following describes one or more example implementations of the disclosed system for an external belt guide for a crop-packaging device, such as a round baler, as shown in the accompanying figures of the drawings described briefly above. It will be understood, however, that the disclosed external belt guide may be utilized with a variety of crop-packaging devices. Generally, the disclosed systems provide for the improved packaging of a crop material by a round baler by positioning a belt guide external to the bale forming chamber. By positioning the belt guide external to the bale forming chamber, the belt guide maintains a position of a respective belt within the bale forming chamber while reducing a build-up or accumulation of crop material between the respective belt and the belt guide. The reduction in the build-up or accumulation of crop material between the respective belt and the belt guide improves the efficiency of the round baler and reduces downtime for maintenance.

Moreover, the external belt guide maintains a structural integrity of the wrap material. In this regard, accumulated crop may increase friction between the belt and an internally positioned belt guide, which may generate heat during the operation of the round baler. In these instances, the generated heat may cause a surface of the internally mounted belt guide and/or belt to have an increased temperature. Because the wrap material is in contact with the belt, this increased temperature may weaken the wrap material. Thus, by positioning the belt guide of the subject disclosure external to the bale forming chamber, the reduction in crop accumulation maintains the external belt guide at a desirable operating temperature for contacting the wrap material.

As used herein, "wrap material" may indicate one of various types of materials utilized to hold bales of compressed crop or other plant matter together or to otherwise maintain the integrity (structural or otherwise) of the bales. Wrap material may include, for example, twine or similar material, net wrap, plastic or other sheeting (i.e., "sheet wrap"), banding, straps, and so on. In certain instances, wrap material may be provided in spools or rolls, including spools of twine, rolls of net wrap, rolls of plastic sheeting, and so on.

The following description relates to the round baler that produces bales 5 feet (ft.) wide. In the example of a round baler that produces 5 ft. wide bales, 5 external belt guides may be positioned external to the bale forming chamber to guide a respective one of 5 belts. It should be noted, however, that the present disclosure is not so limited. In this regard, the round baler may produce bales of any dimension, and may include any number of external belt guides to guide a respective one of the belts of the bale forming chamber. For example, a round baler that produces a 4 ft. wide bale may include 3 external belt guides, with one external belt guide associated with respective ones of the belts of the bale forming chamber.

Figure 1:
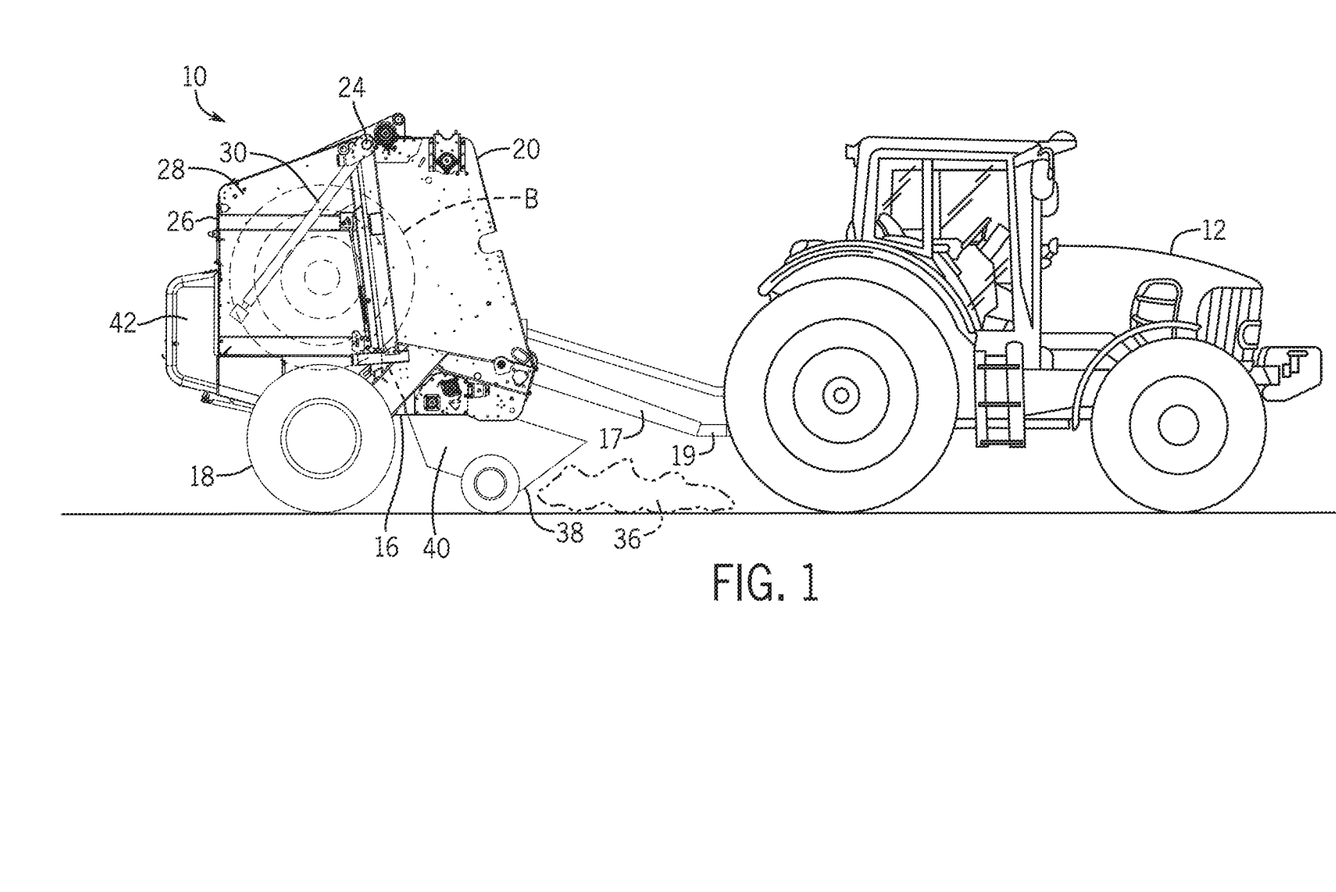
FIG. 1 is a perspective view of an example work vehicle in the form of a tractor, which includes an exemplary crop-packaging device, such as a round baler, having one or more external belt guides according to various embodiments of this disclosure.
Figure 2:
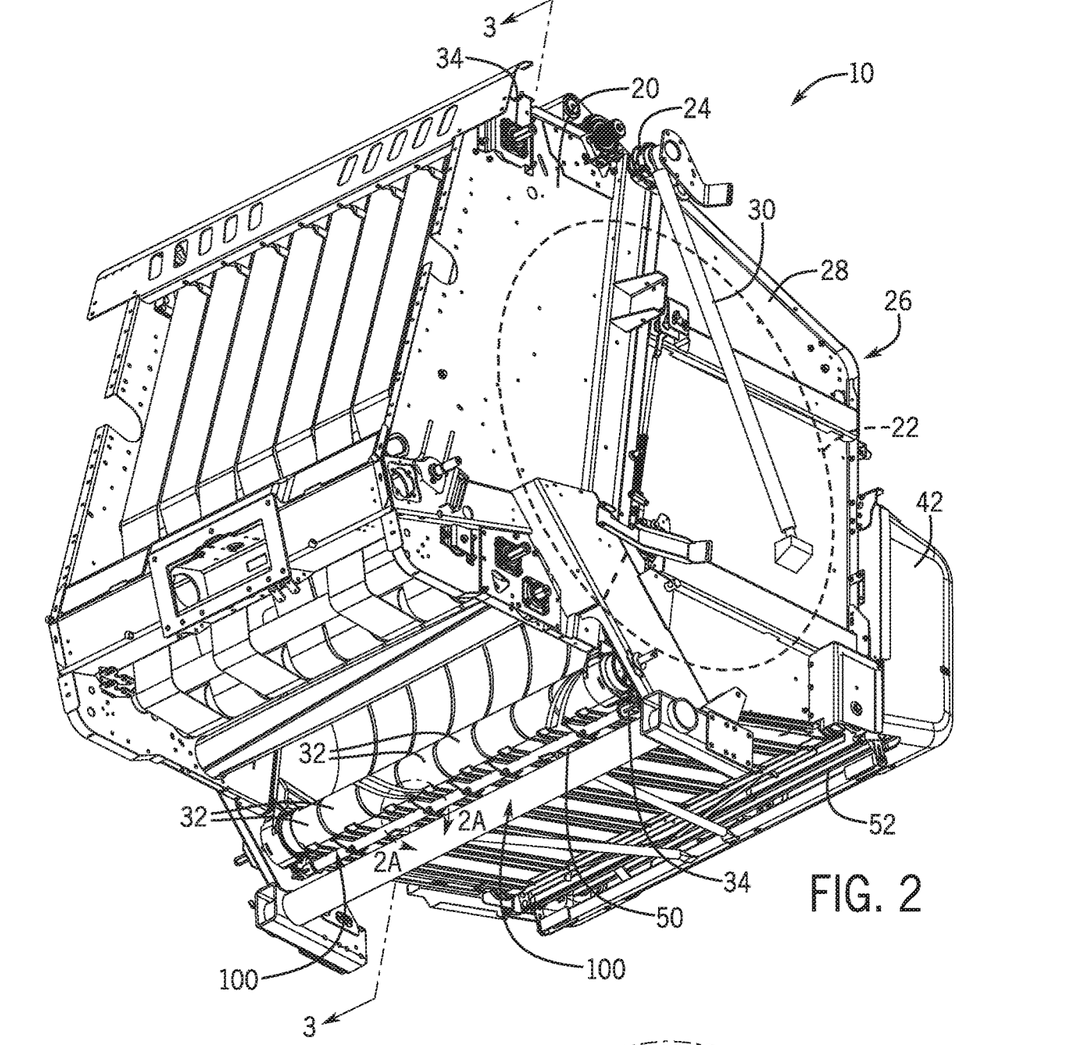
FIG. 2 is a perspective view of the round baler of FIG. 1, which includes the one or more external belt guides.
Figure 2A:
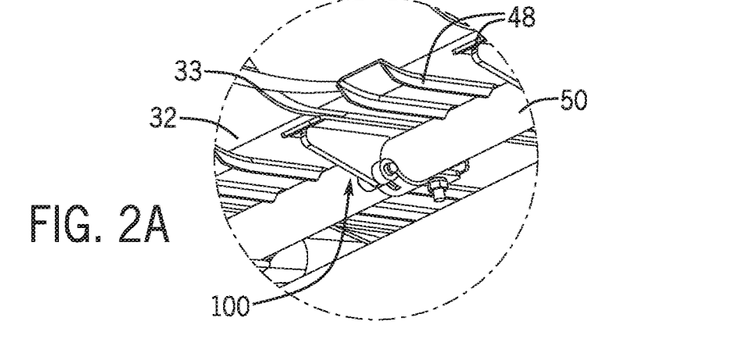
FIG. 2A is a perspective detail view taken from FIG. 2, which illustrates one of the external belt guides.
Figure 3:
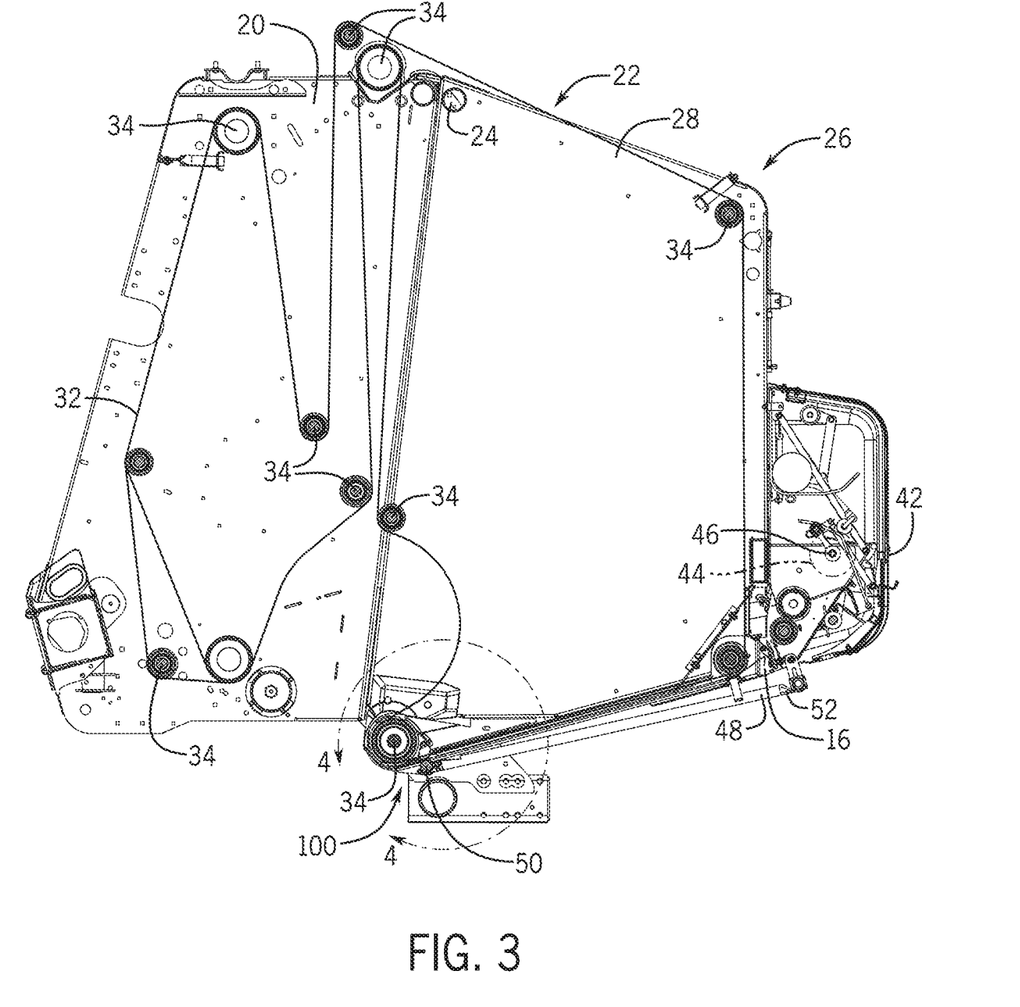
FIG. 3 is a cross-section view of the round baler of FIG. 2, taken along line 3-3 of FIG. 2.

As noted above, the system described herein may be employed with respect to a variety of crop-packaging devices, such as a round baler 10. The baler 10 is configured to be towed by a tractor 12. The baler 10 may have a main frame 16 supported on a pair of ground wheels 18. A draft tongue 17 may have a rear end joined to the main frame 16 and a forward end defined by a clevis arrangement 19 adapted for being coupled to a drawbar (not shown) of the tractor 12. A pair of upright side walls 20 may be fixed to the main frame 16 to define forward regions of opposite side walls of a bale forming (or baling) chamber 22. Mounted for pivoting vertically about a horizontal pivot arrangement 24 located at an upper rear location of the side walls 20 is a discharge gate 26 including opposite upright side walls 28, which define opposite sides of a rear region of the bale forming chamber 22. One or more gate hydraulic cylinders 30 may be coupled between the main frame 16 and the opposite side walls 28 of the discharge gate 26 and are selectively operable for moving the discharge gate 26 between a lowered baling position and an opened discharge position. It is understood that while one cylinder is shown, two or more cylinders may be used to open and close the discharge gate 26. The baler 10 as shown is of a variable chamber design and thus comprises a plurality of longitudinally extending side-by-side belts 32 supported on a plurality of rollers 34. At least one of the rollers 34 is driven, via a chain drive coupled to a motor or other arrangement, to drive the belts about the bale forming chamber 22. As will be discussed, with reference to FIG. 2A, one or more belt guides 100 are coupled or mounted to the baler 10 so as to be positioned externally of the bale forming chamber 22. The belt guides 100 maintain the position of the belts 32 in operating conditions in which the belts are not under tension, such as during a discharge of a bale through the discharge gate 26. With reference to FIG. 3, the bale forming chamber 22 is defined by the rollers 34 and belts 32, and is generally contained between the side walls 20, 28. In one example, the bale forming chamber 22 includes eight belts that cooperate to form a bale having a width of about 5 ft., however, it will be understood that the bale forming chamber 22 may form a bale of any desired size.

With reference back to FIG. 1, the baler 10 may also include one or more controllers, such as electronic controller unit (ECU). The controllers may be configured as computing devices with associated processor devices and memory architectures, as hydraulic, electrical or electro-hydraulic controllers, or otherwise. As such, the controllers may be configured to execute various computational and control functionality with respect to the baler 10 (and other machinery). The controllers may be in electronic, hydraulic, or other communication with various other systems or devices of the baler 10 (or machinery). For example, the controllers may be in electronic or hydraulic communication with various actuators, sensors, and other devices within (or outside of) the baler 10, including various devices associated with the bale forming chamber and related mechanisms. Additionally one or more electro-hydraulic control valves (not shown) may be a part of a baler hydraulic system and interposed in hydraulic lines connecting the gate cylinders 30 with a hydraulic supply associated with the tractor 12. The electro-hydraulic control valve may be electrically activated according to signals from the ECU and may be configured to control the flow of hydraulic fluid between the hydraulic supply associated with the tractor 12 and the gate cylinders 30.

In its general operation the baler 10 is drawn through a field by the tractor 12 attached to the tongue 17. Crop material 36 is fed into a crop inlet 38 of the bale forming chamber from a windrow of crop on the ground by an accumulator 40. In the baler 10, the crop material 36 is rolled in spiral fashion into a cylindrical bale B.

Upon completion, the bale B is wrapped, such as with twine, net or other appropriate wrapping material, via a wrap feed and cut-off system 42. Once the bale B is wrapped, and the bale B is discharged by actuation of gate cylinders 30 that open discharge gate 26 permitting the completed bale B to be discharged from the baler 10 onto the ground. As mentioned previously, the baler 10 illustrated is a variable chamber design wherein crop is rolled up in a spiral fashion in a nip formed between oppositely moving adjacent loops of belts 32. The space between adjacent loops of belts 32 grows as the forming bale B grows larger. Accordingly, a belt tensioning device (not shown) may be provided to take up slack in the belts 32 as needed.

Figure 4:
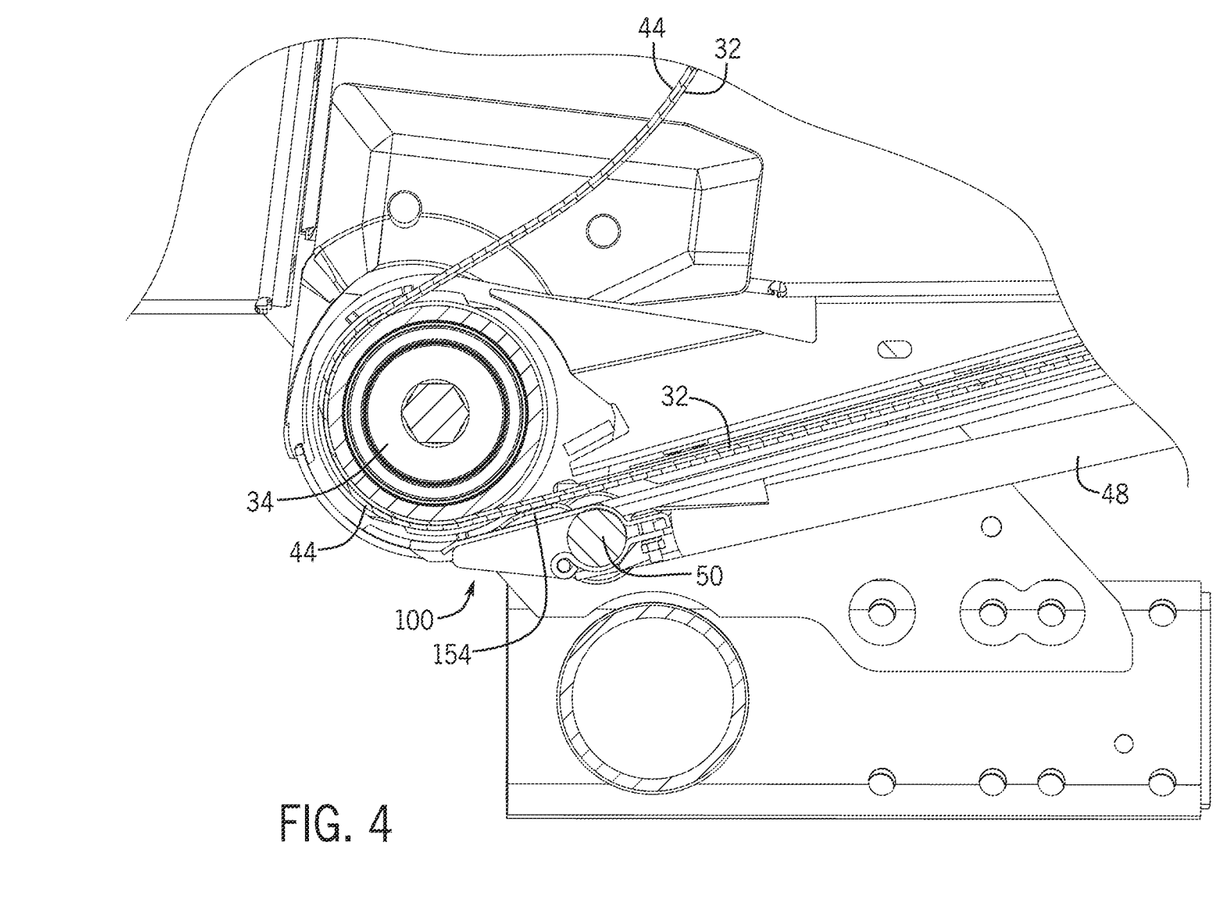
FIG. 4 is a detail cross-sectional view taken from FIG. 3, which illustrates one of the external belt guides contacting a wrap material.

With reference to FIG. 3, the wrap feed and cut-off system 42 is generally coupled to the baler 10 so as to be external to the bale forming chamber 22. The wrap feed and cut-off system 42 generally includes at least one spool of wrap material 44, which is supported on a roller 46. The roller 46 is driven to dispense the wrap material, which is pulled by the belts 32 into the bale forming chamber 22 and around the bale B (FIG. 1). Generally, the wrap feed and cut-off system 42 includes one or more rails 48, which assist in guiding the wrap material 44 from the wrap feed and cut-off system 42 along the belts 32 and into an interior of the bale forming chamber 22. The rails 48 are supported by a first cross-member 50 and a second cross-member 52. Each of the first cross-member 50 and the second cross-member 52 are coupled to the main frame 16. The rails 48 and the pair of cross-members 50, 52 are coupled to the main frame 16 so as to be positioned below the side wall 28, and external to the belts 32 and rollers 34. Thus, the rails 48 and the pair of cross-members 50, 52 are external to the bale forming chamber 22. In this example, the belt guides 100 are coupled to the first cross-member 50 so as to be external to the bale forming chamber 22. As shown in FIG. 4, the belt guides 100 direct the belts 32 and/or the wrap material 44 at a position external to the bale forming chamber 22, thereby reducing an accumulation of crop about the belt guides 100.

Figure 5:
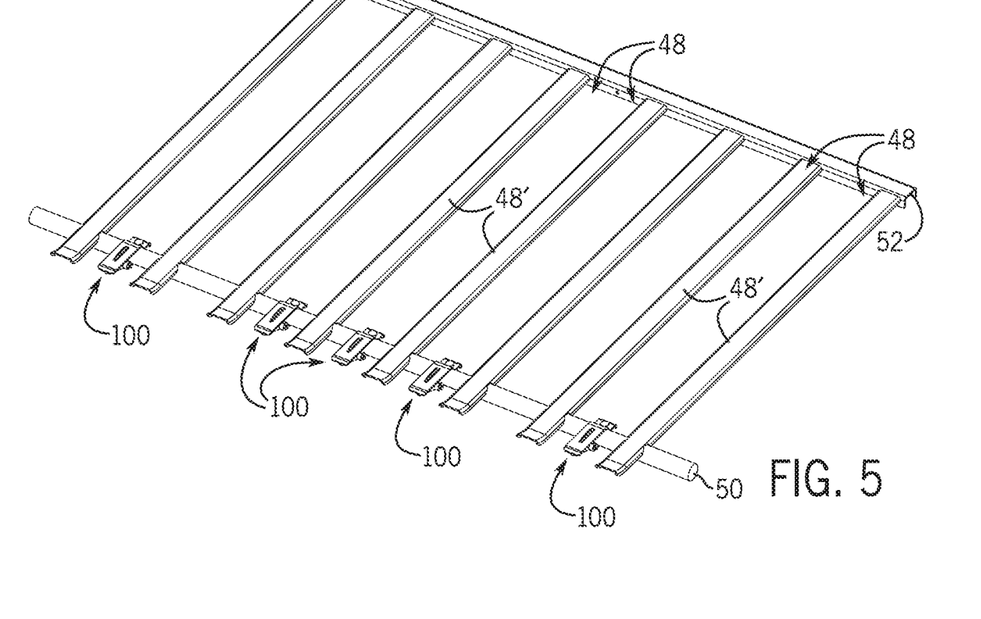
FIG. 5 is a top perspective view of the external belt guides coupled to a portion of a wrap feed and cut-off system associated with the baler of FIG. 2.

With reference now to FIG. 5, the belt guides 100 are shown coupled to the first cross-member 50. In this example, five belt guides 100 are employed to guide the 8 belts 32 (FIG. 2) of the baler 10. It will be understood, however, that any number of belt guides 100 may be used, for example, one of the belt guides 100 may be associated with each one of the belts 32. As shown in FIG. 5, the belt guides 100 are spaced apart along the first cross-member 50. In this example, a majority of the belt guides 100 are positioned so as to be in contact with belts 32 near a mid-section of the bale forming chamber 22, and a reminder of the belt guides 100 are positioned so as to be in contact with belts 32 near the ends of the bale forming chamber 22 (FIG. 2). By placing the majority of the belt guides 100 near the mid-section, the belt guides 100 ensure the belts 32 in the mid-section do not become twisted or tangled when un-tensioned, such as when the gate 26 is in the open discharge position. As will be discussed, at least a portion of each of the belt guides 100 extends a distance above surfaces 48' of the rails 48 to assist in directing the belts 32 and/or wrap material 44 (FIG. 3) into the bale forming chamber 22.

Figure 6:
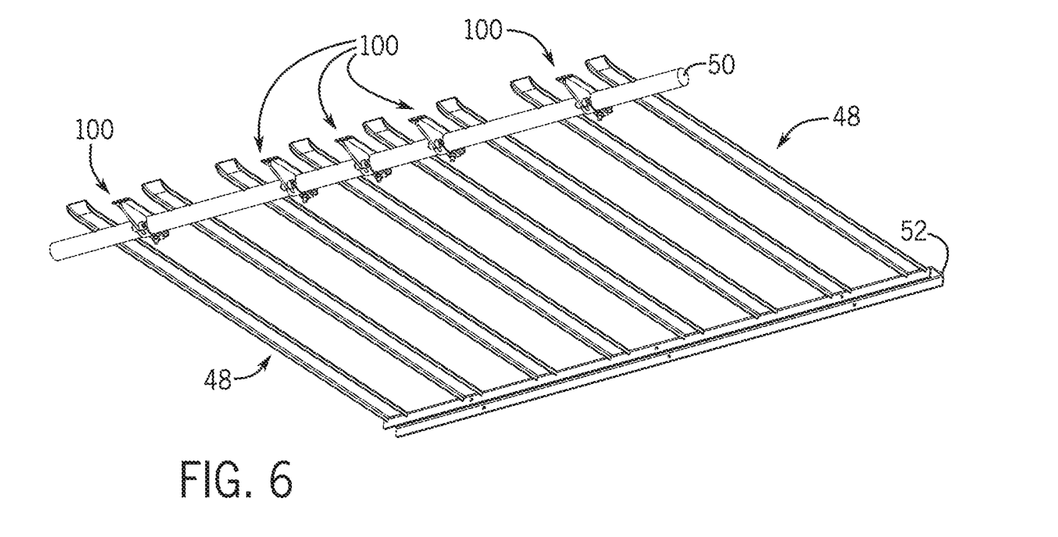
FIG. 6 is a bottom perspective view of the external belt guides coupled to the portion of the wrap feed and cut-off system associated with the baler of FIG. 2.

With reference to FIG. 6, in this example, each of the belt guides 100 is clamped onto the first cross-member 50. Generally, the belt guide 100 is clamped onto the first cross-member 50 so as to be adjustable in three degrees of freedom. In this example, each of the belt guides 100 is adjustable forward/back, up/down and left/right. By providing each of the belt guides 100 to be independently adjustable in three degrees of freedom, the belt guides 100 may be positioned as needed to account for characteristics associated with each of the respective belts 32. For example, one or more of the belts 32 may have a different tension than another one of the belts 32.

Figure 7:
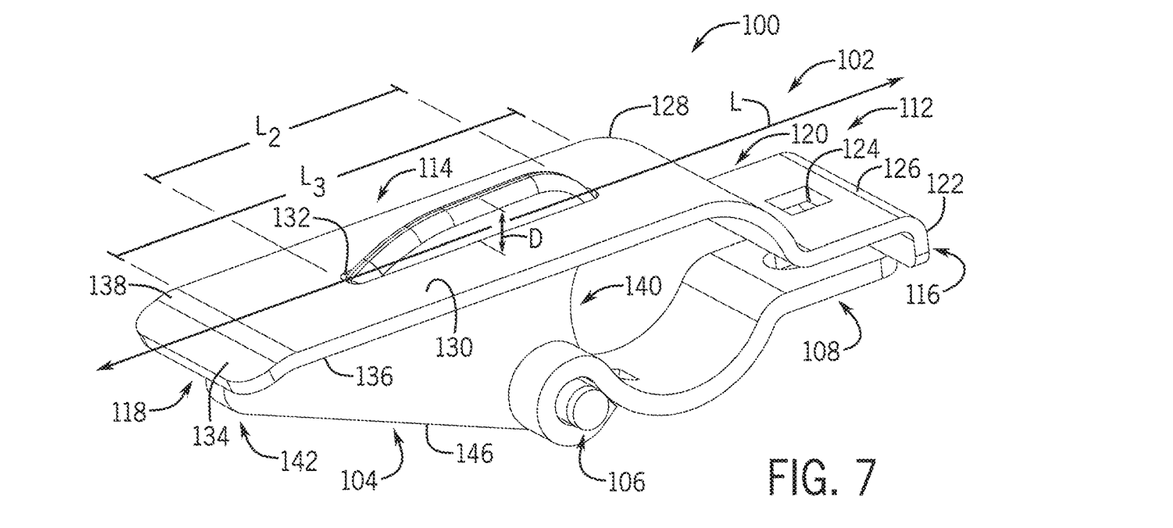
FIG. 7 is a perspective view of one of the external belt guides of FIG. 2.
Figure 8:
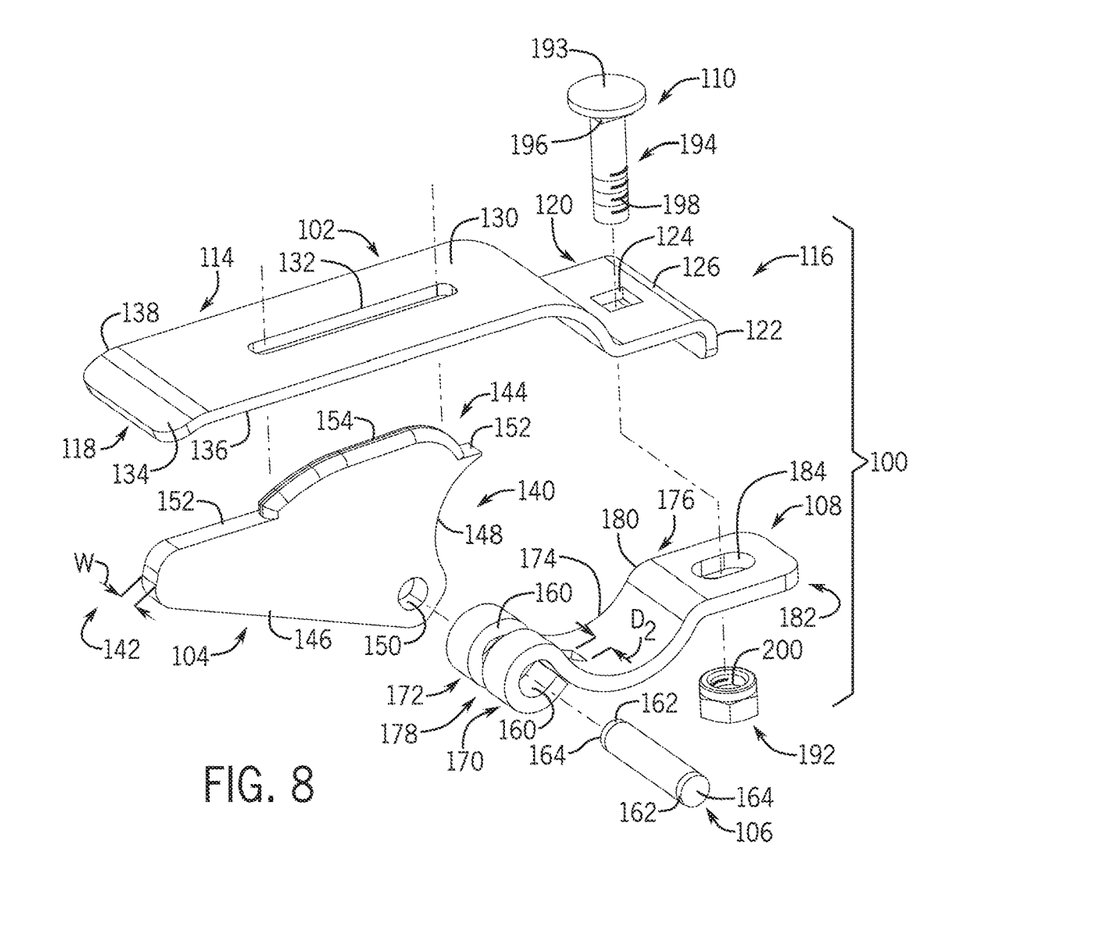
FIG. 8 is an exploded view of the external belt guide of FIG. 7.

With reference to FIG. 7, one of the belt guides 100 is shown in greater detail. As each of the belt guides 100 are the same, only one will be discussed in detail herein with the understanding that the remainder of the belt guides 100 associated with the baler 10 are the same. The belt guide 100 includes a guide body 102, a guide 104, a roll pin 106, a hinge 108 and a fastening assembly 110 (FIG. 8).

The guide body 102 is formed of a metal or metal alloy, and is stamped, machined, cast, forged, etc. In one example, the guide body 102 is composed of a steel, such as A13C steel, however, other metal or metal alloys may be employed. The guide body 102 includes a coupling section 112 and a guide section 114. Generally, the coupling section 112 is defined at a first end 116, and the guide section 114 is defined from a second end 118 to extend toward the first end 116.

The coupling section 112 cooperates with the hinge 108 to couple the belt guide 100 to the first cross-member 50 (FIG. 6). In this example, the coupling section 112 includes a base 120 and a flange 122. The base 120 is substantially planar, and defines an aperture 124 therethrough that receives a portion of the fastening assembly 110 (FIG. 8). In this example, the aperture 124 is substantially rectangular, however, the aperture 124 may have any desired shape that cooperates with the fastening assembly 110 to couple the belt guide 100 to the first cross-member 50 (FIG. 6).

The flange 122 extends from the base 120, and in one example, extends from the base 120 so as to be substantially perpendicular to the base 120. The flange 122 extends from the base 120 at a radius 126, which provides a smooth contact surface for the respective belt and/or wrap material. The flange 122 assists in retaining the belt guide 100 on the first cross-member 50 by contacting the hinge 108 when the belt guide 100 is coupled to the first cross-member 50 to clamp the belt guide 100 to the first cross-member 50 (FIG. 6).

A second radius 128 transitions the base 120 to the guide section 114. The second radius 128 is a first point of contact for the respective belt 32 and/or the wrap material 44 (FIG. 4). The guide section 114 extends from the second radius 128 to the second end 118 of the guide body 102. The guide section 114 generally extends along a longitudinal axis L defined by the belt guide 100. The guide section 114 includes a guide surface 130, a slot 132, a lip 134 and a coupling surface 136. The guide surface 130 is substantially planar and smooth, and extends from the second radius 128 to a third radius 138 that transitions to the lip 134. The guide surface 130 comprises a substantial majority of a surface of the guide section 114, and is a contact surface for the respective belt 32 and/or the wrap material 44. The slot 132 is defined through the guide surface 130 between the second radius 128 and the third radius 138. The slot 132 receives a portion of the guide 104. The slot 132 generally extends for a length L2, which is substantially less than a length L3 of the guide surface 130.

The lip 134 extends from the third radius 138 to the second end 118. The lip 134 extends along an axis that is substantially traverse or oblique to the longitudinal axis L. The lip 134 is a last point of contact for the respective belt 32 and/or the wrap material 44 (FIG. 4). The coupling surface 136 is substantially opposite the guide surface 130. In one example, a portion of the coupling surface 136 is welded to the guide 104 to fixedly couple the guide 104 to the guide body 102.

With reference to FIG. 8, the guide 104 includes a first end 140, a second end 142, a first surface 144 and a second surface 146. The guide 104 is formed of a metal or metal alloy, and is stamped, machined, cast, forged, etc. In one example, the guide body 102 is composed of a steel, such as a heat treated 1045 steel, however, other metal or metal alloys may be employed. The first end 140 includes an arcuate portion 148 and defines a bore 150. The arcuate portion 148 is substantially concave, and is configured to mate with the cylindrical shape of the first cross-member 50 (FIG. 6). The bore 150 is defined through the guide 104 at the first end 140 so as to be adjacent to or near the second surface 146. The bore 150 is sized to receive the roll pin 106 therethrough to couple the roll pin 106 to the guide 104.

The second end 142 is rounded and is substantially opposite the first end 140. The first surface 144 is defined between the first end 140 and the second end 142. The first surface 144 includes a coupling section 152 and a guide protrusion 154. The coupling section 152 is welded to the coupling surface 136 of the guide body 102 to fixedly couple the guide 104 to the guide body 102. In one example, the coupling surface 136 and the coupling section 152 are welded together through a suitable welding process, such as stick welding, MIG welding, flux wire welding, TIG welding, resistance spot welding, etc. The guide protrusion 154 extends upwardly from the first surface 144 and is disposed between opposing ends of the coupling section 152 such that the guide 104 is coupled to the guide body 102 on opposite sides of the guide protrusion 154. The guide protrusion 154 is arcuate in shape, and has a curved surface. The guide protrusion 154 is machined to have no sharp edges. Generally, the guide protrusion 154 is also polished such that as the respective belt 32 and/or the wrap material 44 passes over the guide protrusion 154 the respective belt 32 and/or the wrap material 44 is not damaged by the guide protrusion 154. With reference to FIG. 7, the guide protrusion 154 is received within and through the slot 132 when the guide 104 is coupled to the guide body 102. The guide protrusion 154 generally extends for a distance D beyond the guide surface 130 of the guide body 102 adjacent an edge 33 (FIG. 2A) of the respective belt 32 to contact the respective belt 32 and/or the wrap material 44 to direct the respective belt 32 and/or the wrap material 44.

With reference back to FIG. 8, the second surface 146 is substantially opposite the first surface 144. The second surface 146 tapers from the first end 140 to the second end 142. Stated another way, the second surface 146 extends along an axis that is substantially transverse or oblique to the longitudinal axis L of the belt guide 100 (FIG. 7). The tapered shape of the second surface 146 provides a reduced profile for the belt guide 100 when viewed from a rear or bottom surface of the first cross-member 50 (FIG. 6).

The roll pin 106 is received through the bore 150 defined in the guide 104, and through bores 160 defined through the hinge 108 to couple the hinge 108 to the guide 104. Generally, the roll pin 106 is press-fit into the bore 150 to couple the roll pin 106 to the guide 104. The roll pin 106 is formed of a metal or metal alloy, and is stamped, machined, cast, forged, etc. In one example, the roll pin 106 is formed of steel. The roll pin 106 may include a reduced diameter 162 at opposing ends 164 to aid in press-fitting the roll pin 106 into the bore 150. The roll pin 106 movably or pivotally couples the hinge 108 to the guide 104.

The hinge 108 includes a first knuckle 170, a second knuckle 172, an arcuate section 174 and a mounting portion or section 176. The hinge 108 is formed of a metal or metal alloy, and is stamped, machined, cast, forged, etc. In one example, the hinge 108 is composed of a steel, such as A13C steel, however, other metal or metal alloys may be employed. The first knuckle 170 is spaced apart from the second knuckle 172 at a first end 178 of the hinge 108. The first knuckle 170 and the second knuckle 172 each define the bore 160, which receives the roll pin 106. Generally, the first knuckle 170 is spaced apart from the second knuckle 172 by a distance D2, which is at least equal to or greater than a width W of the guide 104 such that the guide 104 may be received between the first knuckle 170 and the second knuckle 172.

The arcuate section 174 is defined adjacent to the first knuckle 170 and the second knuckle 172, and extends from the first knuckle 170 and the second knuckle 172 to the mounting section 176. The arcuate section 174 is substantially concave and has a radius configured to mate with the cylindrical first cross-member 50 (FIG. 6). The arcuate section 174 transitions to the mounting section 176 at a fourth radius 180.

The mounting section 176 extends from the fourth radius 180 to a second end 182 of the hinge 108. The mounting section 176 is substantially planar, and defines a bore 184. The bore 184 is sized and shaped to cooperate with a portion of the fastening assembly 110. In this example, the bore 184 is oval, however, the bore 184 may have any desired shape. The bore 184 is defined through the mounting section 176 between the fourth radius 180 and the second end 182.

The fastening assembly 110 couples the belt guide 100 to the first cross-member 50 (FIG. 6). In this example, the fastening assembly 110 includes a bolt 190 and a nut 192. It will be understood, however, that various other fastening devices may be employed to removably couple the belt guide 100 to the first cross-member 50, such as cotter pins, etc. The bolt 190 includes a head 193 and a shank 194. A rectangular key 196 may be defined adjacent to the head 193 to assist in positioning the bolt 190 through the aperture 124. In this regard, the key 196 may be shaped and configured to mate with the aperture 124 to aid in seating the bolt 190 with the aperture 124. The shank 194 is at least partially threaded, and includes a plurality of threads 198. The plurality of threads 198 mate with a corresponding plurality of threads 200 defined within the nut 192 to couple the belt guide 100 to the first cross-member 50.

With each of the guide body 102, the guide 104, the roll pin 106 and the hinge 108 formed, the belt guide 100 is assembled. In one example, the guide 104 is received through the slot 132. With the guide 104 received in the slot 132, the coupling surface 136 is fixedly coupled to the coupling section 152, via welding, for example. The hinge 108 is positioned about the guide 104, such that the bores 160 are coaxially aligned with the bore 150. The roll pin 106 is inserted through one of the bores 160 and press-fit to the guide 104, such that each of the first knuckle 170 and the second knuckle 172 are supported for rotation relative to the guide 104 by the roll pin 106. Thus, the hinge 108 is coupled to the guide 104 at the first end 178.

With the belt guide 100 assembled, with reference to FIG. 6, the belt guide 100 is coupled to the first cross-member 50 of the pre-assembled baler 10 such that the first cross-member 50 is received between the arcuate portion 148 of the guide 104, the arcuate section 174 of the hinge 108 and a portion of the coupling surface 136 adjacent to and at the second radius 128. Stated another way, the portion of the coupling surface 136 uncoupled from the guide 104 near and at the second radius 128 cooperates with the arcuate portion 148 and the arcuate section 174 to define a substantially circular opening that receives the first cross-member 50. In other words, the hinge 108 has the second end 182 that cooperates with the guide 104 and the guide body 102 to receive a portion of the round baler or the first cross-member 50 to couple the belt guide 100 to the round baler 10 such that the belt guide 100 is positioned external to the bale forming chamber 22 (FIG. 2).

With the belt guide 100 positioned about the first cross-member 50, the belt guide 100 may be adjusted forward/rearward, left/right and up/down as needed to ensure the belt guide 100 contacts the respective belt when the belts 32 are not tensioned. With the belt guide 100 in the desired position, the bolt 190 is inserted into the aperture 124 and through the bore 184. The nut 192 threadably engages with the bolt 190 to couple the belt guide 100 to the first cross-member 50. The bolt 190 and/or nut 192 may be tightened until a desired or predetermined clamp force is reached. This process may be repeated any number of times until the desired or predetermined number of belt guides 100 are coupled to the first cross-member 50.

With the predetermined number of belt guides 100 coupled to the first cross-member 50, the guide protrusion 154 and the guide surface 130 of the belt guides 100 may contact respective one of the belts 32 in instances where the respective belts 32 are not under tension. The contact between the guide protrusion 154 and the guide surface 130 maintains the respective belts 32 in the desired orientation and position for resuming operation for forming a bale. The position of the belt guides 100 as external to the bale forming chamber 22 ensures that crop material does not accumulate between the belts 32 and/or the belt guides 100, and maintains the belt guides 100 at an optimum working temperature (through the reduction of friction that may be caused by accumulated crop material). This further ensures that when the wrap material 44 is fed from the wrap feed and cut-off system 42, the wrap material 44 is not damaged by the belt guides 100. Moreover, the guide protrusion 154 and the guide surface 130 cooperate to direct the wrap material 44 along the belts 32 and into the bale forming chamber 22 to secure a formed bale B (FIG. 1).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A round baler comprising:
   a bale forming chamber having a belt to form a bale of crop material;
   a wrap feed system; and
   a belt guide coupled to the baler so as to be external to the bale forming chamber, the belt guide comprising:
      a guide body having an inwardly facing surface configured to contact the belt or wrap material and defining an opening in the guide body; and
      a guide having a protrusion extending through the opening in the guide body inwardly towards the bale forming chamber adjacent an edge of the belt;
      wherein the belt guide is configured to sandwich the wrap material between the belt and the inwardly facing surface of the guide body.

2. The round baler of claim 1, wherein the wrap material is sandwiched between the inwardly facing surface and an external surface of the belt.

3. The round baler of claim 2, wherein the wrap material flows over the protrusion of the belt guide along the edge the belt.

4. The round baler of claim 3, wherein the bale forming chamber further comprises a roller, the belt guide being positioned proximate the roller.

5. The round baler of claim 1, wherein the belt guide further comprises:
   a hinge coupled to the guide at a first end, the hinge having a second end that cooperates with the guide and the guide body to receive a portion of the baler to couple the belt guide to the baler such that the belt guide is external to the bale forming chamber.

6. The round baler of claim 5, wherein the guide body includes a coupling portion, and the hinge includes a mounting portion at the second end that cooperates with the coupling portion to couple the belt guide to the portion of the baler.

7. The round baler of claim 5, wherein the portion of the baler is a cross-member associated with the wrap feed system.

8. The round baler of claim 1, wherein the guide body is fixedly coupled to the guide.

9. A round baler comprising:
   a bale forming chamber having a belt to form a bale of crop material, the belt supported on a roller;
   a wrap feed system; and
   a belt guide coupled to the baler so as to be external to the bale forming chamber and proximate the roller, the belt guide comprising:

a guide body having an inwardly facing surface configured to contact the belt or wrap material and defining an opening in the guide body; and a guide having a protrusion extending through the opening in the guide body inwardly towards the bale forming chamber adjacent an edge of the belt;

wherein the belt guide is configured to sandwich wrap material between the belt and the inwardly facing surface of the guide body, and the wrap material flows over the protrusion of the belt guide along the edge the belt.

10. The round baler of claim 9, wherein the wrap material is sandwiched between the inwardly facing surface and an external surface of the belt.

11. The round baler of claim 9, wherein the belt guide further comprises:

a hinge coupled to the guide at a first end, the hinge having a second end that cooperates with the guide and the guide body to receive a portion of the baler to couple the belt guide to the baler such that the belt guide is external to the bale forming chamber.

12. The round baler of claim 11, wherein the guide body includes a coupling portion, and the hinge includes a mounting portion at the second end that cooperates with the coupling portion to couple the belt guide to the portion of the baler.

13. The round baler of claim 12, wherein the portion of the baler is a cross-member associated with the wrap feed system.

14. The round baler of claim 9, wherein the opening in the guide body defines a slot, and the protrusion extends through the slot such that the protrusion extends a distance above the inwardly facing surface.

15. A round baler comprising:

a bale forming chamber having a belt to form a bale of crop material, the belt supported on a roller;

a wrap feed system; and a belt guide coupled to the baler so as to be external to the bale forming chamber and proximate the roller, the belt guide comprising:

a guide body having an inwardly facing surface configured to contact the belt or wrap material and defining an opening in the guide body; and a guide having a protrusion extending through the opening in the guide body inwardly towards the bale forming chamber adjacent an edge of the belt;

wherein the belt guide is configured to sandwich wrap material between the inwardly facing surface and an external surface of the belt.

16. The round baler of claim 15, wherein the wrap material flows over the protrusion of the belt guide along the edge the belt.

17. The round baler of claim 15, wherein the belt guide further comprises:

a hinge coupled to the guide at a first end, the hinge having a second end that cooperates with the guide and the guide body to receive a portion of the baler to couple the belt guide to the baler such that the belt guide is external to the bale forming chamber.

* * * * *

UNITED STATES PATENT AND TRADEMARK OFFICE
CERTIFICATE OF CORRECTION

PATENT NO.       : 11,032,974 B2  
APPLICATION NO.  : 15/883735  
DATED            : June 15, 2021  
INVENTOR(S)      : Pilcher et al.

Page 1 of 1

It is certified that error appears in the above-identified patent and that said Letters Patent is hereby corrected as shown below:

In the Claims

In Column 10, Claim 3, Line 39, delete "edge the" and insert -- edge of the --, therefor.

In Column 11, Claim 9, Line 11, delete "edge the" and insert -- edge of the --, therefor.

In Column 12, Claim 16, Line 22, delete "edge the" and insert -- edge of the --, therefor.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*